(12) United States Patent
Kuroki et al.

(10) Patent No.: US 12,542,806 B2
(45) Date of Patent: Feb. 3, 2026

(54) ANALYSIS DEVICE, ANALYSIS METHOD, AND ANALYSIS SYSTEM

(71) Applicant: NTT, Inc., Tokyo (JP)

(72) Inventors: Kotomi Kuroki, Tokyo (JP); Yo Kanemoto, Tokyo (JP)

(73) Assignee: NTT, Inc., Tokyo (JP)

( * ) Notice: Subject to any disclaimer, the term of this patent is extended or adjusted under 35 U.S.C. 154(b) by 58 days.

(21) Appl. No.: 18/563,346

(22) PCT Filed: May 27, 2021

(86) PCT No.: PCT/JP2021/020302
§ 371 (c)(1),
(2) Date: Nov. 21, 2023

(87) PCT Pub. No.: WO2022/249416
PCT Pub. Date: Dec. 1, 2022

(65) Prior Publication Data
US 2024/0214417 A1    Jun. 27, 2024

(51) Int. Cl.
*H04L 9/40*    (2022.01)
(52) U.S. Cl.
CPC .................. *H04L 63/1458* (2013.01)
(58) Field of Classification Search
CPC .................................................. H04L 63/1458
See application file for complete search history.

(56) References Cited

U.S. PATENT DOCUMENTS

| | | | | |
|---|---|---|---|---|
| 11,438,361 B2* | 9/2022 | Rakesh | ............... | H04L 63/1425 |
| 2020/0304534 A1* | 9/2020 | Rakesh | ............... | H04L 63/1433 |
| 2021/0150022 A1* | 5/2021 | Karas | ............... | H04L 63/1466 |
| 2023/0015273 A1* | 1/2023 | Kura | ............... | G06F 11/0793 |
| 2023/0084768 A1* | 3/2023 | Inui | ............... | H04L 63/1433 |
| | | | | 726/34 |
| 2023/0132559 A1* | 5/2023 | Ishihara | ............... | G06F 21/64 |
| | | | | 711/154 |
| 2023/0370482 A1* | 11/2023 | Zhang | ............... | H04L 63/145 |
| 2023/0376607 A1* | 11/2023 | Kamimura | ............... | G06F 21/57 |
| 2023/0388344 A1* | 11/2023 | Vissamsetty | ........ | H04L 63/1491 |
| 2023/0394138 A1* | 12/2023 | Noeth | ............... | H04L 43/062 |
| 2024/0015182 A1* | 1/2024 | Kim | ............... | H04L 51/00 |
| 2024/0054213 A1* | 2/2024 | Takahashi | ............... | G06F 11/07 |

(Continued)

FOREIGN PATENT DOCUMENTS

EP    3637292 A1 *  4/2020  ............ G06F 21/55

OTHER PUBLICATIONS

Stasinopoulos et al. (2018) "Commix: automating evaluation and exploitation of command injection vulnerabilities in Web applications" International Journal of Information Security, Feb. 1, 2018.

(Continued)

*Primary Examiner* — Stephen T Gundry (57) ABSTRACT

When an attack by command injection is detected, an analysis device (10) extracts an attack command string inserted for the attack from an attack request transmitted in the attack, and acquires information obtained by executing the extracted attack command string. Also, the analysis device (10) determines an intention of the attack by the command injection using the acquired information, and outputs information indicating the determined intention of the attack.

17 Claims, 10 Drawing Sheets

(56) References Cited

U.S. PATENT DOCUMENTS

| | | | | |
|---|---|---|---|---|
| 2024/0146757 A1* | 5/2024 | Isoyama | ............... | H04L 63/20 |
| 2024/0152603 A1* | 5/2024 | Usui | ................... | G06F 21/53 |
| 2024/0152615 A1* | 5/2024 | Usui | ................... | G06F 21/56 |
| 2024/0154976 A1* | 5/2024 | Kanemoto | ............ | G06F 21/55 |
| 2024/0160746 A1* | 5/2024 | Kamimura | ........... | G06F 21/577 |
| 2024/0187429 A1* | 6/2024 | Kanemoto | ......... | H04L 63/1416 |
| 2024/0356971 A1* | 10/2024 | Vissamsetty | ......... | G06F 21/566 |
| 2024/0386109 A1* | 11/2024 | Kurtz | ................. | G06F 21/577 |
| 2025/0077648 A1* | 3/2025 | Karas | ............... | H04L 63/1466 |

OTHER PUBLICATIONS

Pietraszek et al. (2005) "Defending against Injection Attacks through Context-Sensitive String Evaluation" Proceedings of Recent Advances in Intrusion Detection (RAID2005), Sep. 7, 2005.

Lin et al. (2007) "The Automatic Defense Mechanism for Malicious Injection Attack" 7th IEEE International Conference on Computer and Information Technology (CIT 2007), Oct. 16, 2007.

Kuroki et al. (2020) "Attack Intention Estimation Based on Syntax Analysis and Dynamic Analysis for SQL Injection" 2020 IEEE 44th Annual Computers, Software, and Applications Conference (COMPSAC), Jul. 13, 2020, pp. 1510-1515.

Kuroki et al. (2020) "A Damage Identification Method Based on Syntax Analysis and Semantic Analysis for SQL Injection" Proceedings of the 2020 Symposium on Cryptography and Information Security, Jan. 21, 2020, pp. 1-8.

Zhong et al. (2015) "A Log Correlation Method to Identify the Target and the Effect of Web Attacks" Computer Security Symposium 2015 Proceedings, vol. 2015, No. 3, pp. 132-139.

* cited by examiner

REQUEST EXAMPLE

```
GET /cgi-bin/submit.cgi?user=;cat /etc/passwd HTTP/1.1
Host: x.x.x.x
Connection: keep-alive
...
```

Fig. 5

REQUEST EXAMPLE

GET /cgi-bin/submit.cgi?user=;cat /etc/passwd HTTP/1.1

ATTACK COMMAND STRING cat /etc/passed

100
ANALYSIS DEVICE, ANALYSIS METHOD, AND ANALYSIS SYSTEM

CROSS-REFERENCE TO RELATED APPLICATIONS

This application is a U.S. 371 Application of International Patent Application No. PCT/JP2021/020302, filed on 27 May 2021, the disclosure of which is hereby incorporated herein by reference in its entirety.

TECHNICAL FIELD

The present invention relates to an analysis device, an analysis method, and an analysis system.

BACKGROUND ART

In the related art, a technique for taking countermeasures against OS command injection is known. Here, the OS command injection is one external attack method on a computer system, and is an attack in which a fragment that can be interpreted as a command of an operating system (hereinafter referred to as OS) is mixed into an input character string for the system and is executed illegally.

For example, as a technique for detecting OS command injection, there is known a web application firewall (WAF) for detecting or blocking traffic matching rules such as regular expressions prepared in advance as an attack.

CITATION LIST

Non Patent Literature

[NPL 1] A Stasinopoulos et al., "Commix: automating evaluation and exploitation of command injection vulnerabilities in Web applications," International Journal of Information Security, 2018.
[NPL 2] Pietraszek, T., VandenBerghe, C, "Defending against injection attacks through context-sensitive string evaluation." Proceedings of 8th International Conference on Recent Advances in Intrusion Detection, 2005.
[NPL 3] Jin-Cherng Lin, Jan-Min Chen, "The automatic defense mechanism for malicious injection attack," IEEE, 7th IEEE International Conference on Computer and Information Technology, 2007.

SUMMARY OF INVENTION

Technical Problem

However, the related art has a problem that it is not possible to identify the intention of the detected OS command injection attack. Even if OS command injection can be detected, if it is unclear what kind of damage will be caused by the attack, it may not be possible to efficiently study the details of countermeasures.

Solution to Problem

In order to solve the above-mentioned problem and achieve the object, there is provided an analysis device including: an extraction part that extracts, when an attack by command injection is detected, an attack command string inserted for the attack from an attack request transmitted in the attack; an execution part that acquires information obtained by executing the attack command string extracted by the extraction part; an identification part that determines an intention of the attack by the command injection using the information acquired by the execution part; and an output part that outputs information indicating the attack intention determined by the identification part.

Advantageous Effects of Invention

According to the present invention, it is possible to identify the intention of a detected OS command injection attack.

DESCRIPTION OF EMBODIMENTS

Hereinafter, embodiments of an analysis device, an analysis method, and an analysis system according to the present application will be described in detail with reference to the drawings. Note that the present invention is not limited by the embodiments described below.

First Embodiment

[Configuration of First Embodiment]

Figure 1:
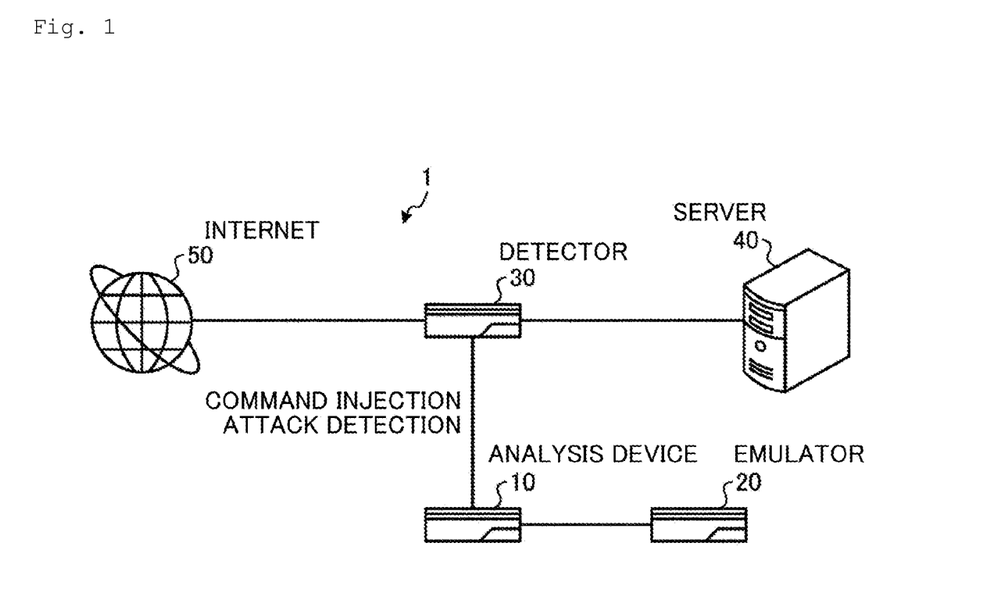
FIG. 1 is a diagram illustrating an example of a configuration of an analysis system according to a first embodiment.

First, a configuration of an analysis system according to a first embodiment will be described with reference to FIG. 1. FIG. 1 is a diagram illustrating an example of the configuration of the analysis system according to the first embodiment. As illustrated in FIG. 1, an analysis system 1 includes an analysis device 10, an emulator 20, a detector 30, and a server 40. The server 40 is connected to the Internet 50 via the detector 30. Note that the configuration illustrated in FIG. 1 is merely an example and the specific configuration and the numbers of each device are not particularly limited.

When the detector 30 detects OS command injection, the analysis device 10 receives an attack request of OS command injection from the detector 30, extracts an attack command from the attack request, executes the attack command in an emulation environment, and estimates an attack intention of the attack request.

The emulator 20 simulatively executes an attack command in an emulation environment. The detector 30 detects an attack request by OS command injection for the purpose of attack to the server 40, which is a Web request sent via the Internet 50.

The server 40 is, for example, a web server accessible through the Internet 50. For example, the server 40 executes a database or a Web application using the database. The server 40 receives, for example, a Web request via the Internet 50, executes processing according to the Web request, and returns a response.

Figure 2:
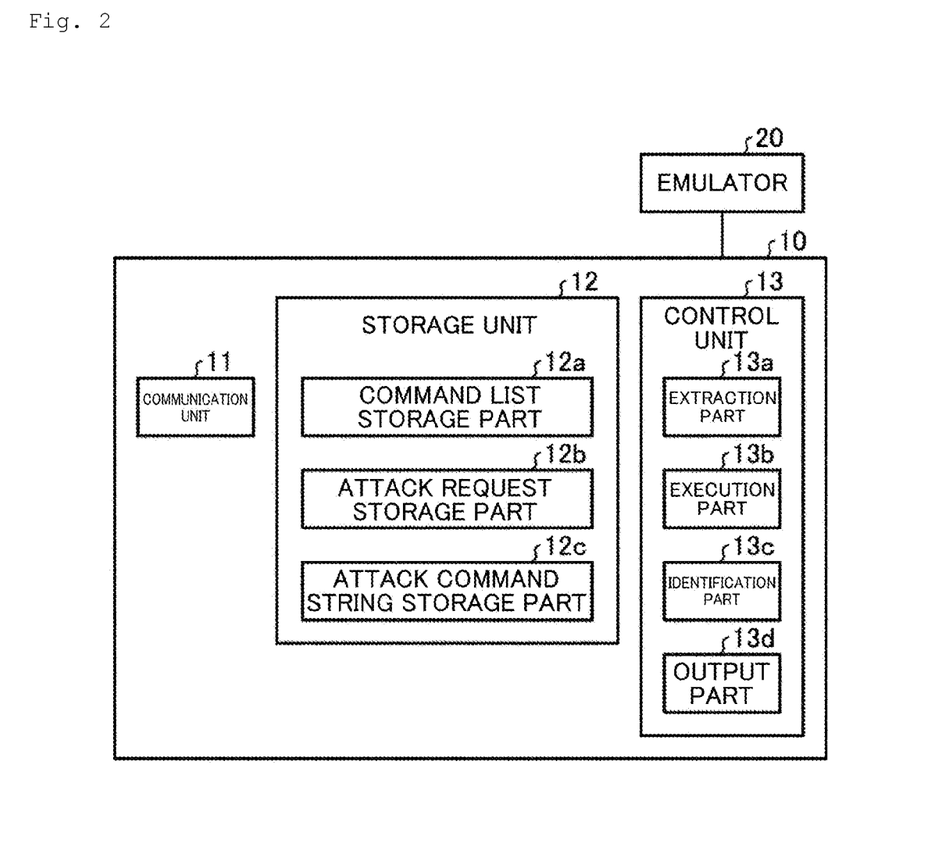
FIG. 2 is a diagram illustrating an example of a configuration of an analysis device according to the first embodiment.

The configuration of the analysis device 10 will be described with reference to FIG. 2. FIG. 2 is a diagram illustrating an example of the configuration of the analysis device according to the first embodiment. As illustrated in FIG. 2, the analysis device 10 includes a communication unit 11, a storage unit 12, and a control unit 13.

The communication unit 11 is realized by a network interface card (NIC) or the like, and controls communication with an external device via a telecommunication line such as a local area network (LAN) or the Internet. For example, the communication unit 11 receives an attack request from the detector 30.

The storage unit 12 is a storage device such as a hard disk drive (HDD), a solid state drive (SSD), or an optical disc. The storage unit 12 may be a data rewritable semiconductor memory, such as a random access memory (RAM), a flash memory, or a non-volatile static random access memory (NVSRAM). The storage unit 12 stores an operating system (OS) or various programs that are executed by the analysis device 10. The storage unit 12 includes a command list storage part 12a, an attack request storage part 12b, and an attack command string storage part 12c.

Figure 3:
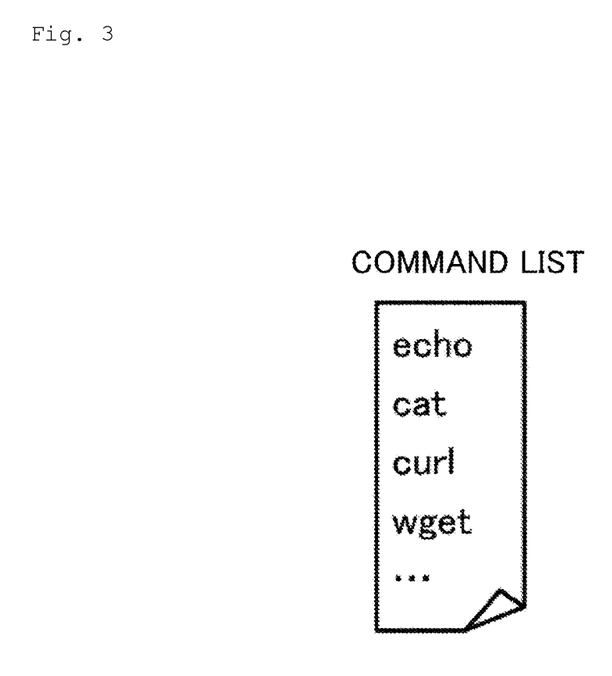
FIG. 3 is a diagram illustrating an example of a command list.

The command list storage part 12a stores an OS command list. For example, the command list storage part 12a stores a general OS command list as exemplified in FIG. 3. FIG. 3 is a diagram illustrating an example of a command list.

Figure 4:
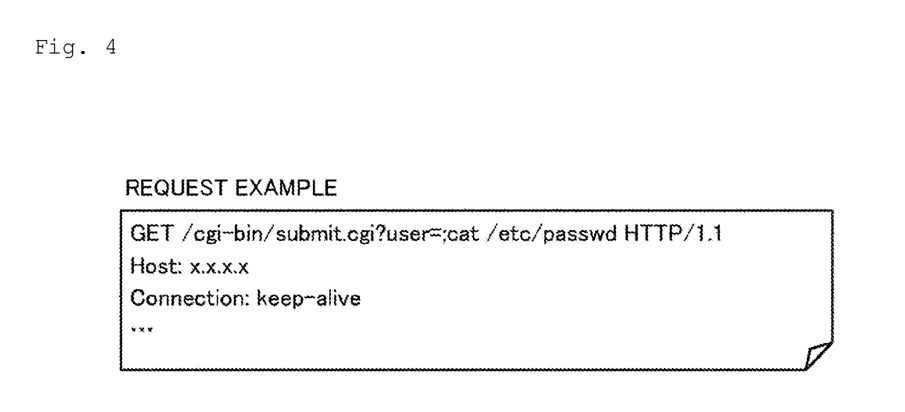
FIG. 4 is a diagram illustrating an example of an attack request.

The attack request storage part 12b stores an attack request. For example, the attack request storage part 12b stores an attack request of OS command injection received from the detector 30. FIG. 4 is a diagram illustrating an example of an attack request. The GET method Web request exemplified in FIG. 4 is a Web request detected by the detector 30.

The attack command string storage part 12c stores an attack command string extracted by an extraction part 13a, which will be described later. Here, the attack command string is a command string inserted by an attacker for an attack.

Here, the control unit 13 has an internal memory for storing programs defining various processing procedures and required data, and executes various types of processing using these. For example, the control unit 13 includes an extraction part 13a, an execution part 13b, an identification part 13c and an output part 13d. Here, the control unit 13 is an electronic circuit such as a central processing unit (CPU) or a micro processing unit (MPU) or an integrated circuit such as an application specific integrated circuit (ASIC) or a field programmable gate array (FPGA).

Figure 5:
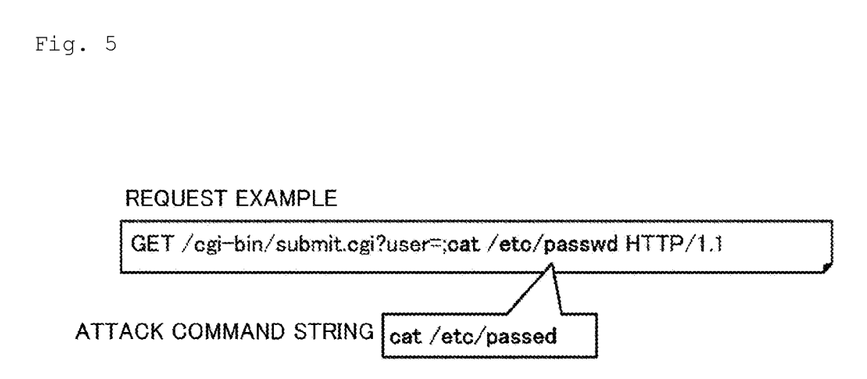
FIG. 5 is a diagram illustrating processing for extracting an attack command string included in an attack request.

When an attack by command injection is detected, the extraction part 13a extracts an attack command string inserted for the attack from an attack request transmitted in the attack. To describe specific example, for example, as exemplified in FIG. 5, the extraction part 13a extracts the attack command string "cat/etc/passed" from the GET method Web request using a general OS command list, regular expressions, and the like. FIG. 5 is a diagram illustrating processing for extracting an attack command string included in an attack request.

Figure 6:
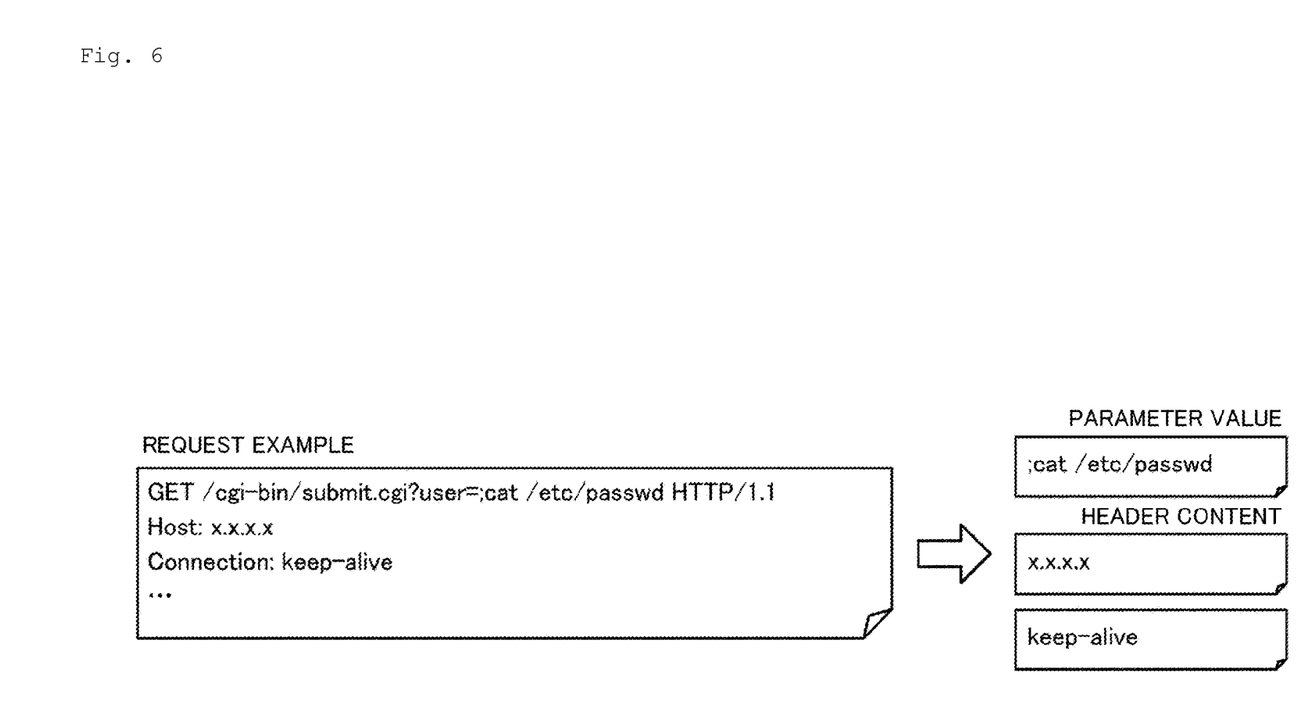
FIG. 6 is a diagram illustrating an example of processing for dividing an attack request.
Figure 7:
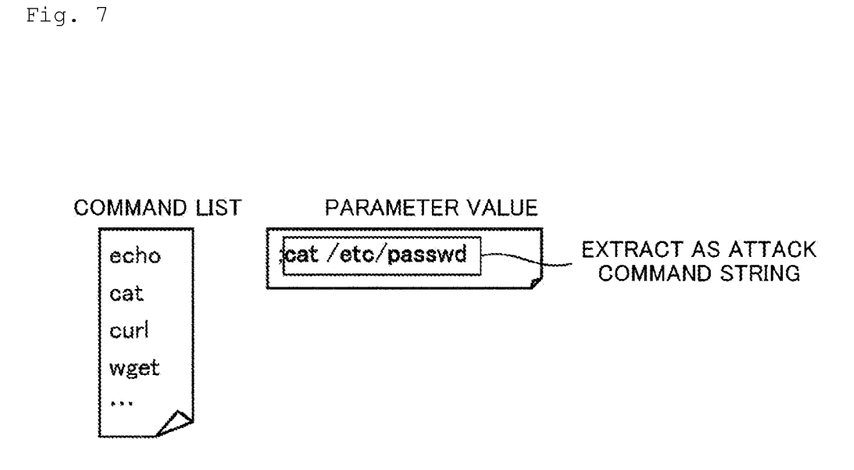
FIG. 7 is a diagram illustrating an example of processing for extracting an attack command string.

For example, the extraction part 13a extracts an attack command string using a preset command list. An example of specific processing of the extraction part 13a will be described below with reference to FIGS. 6 and 7. FIG. 6 is a diagram illustrating an example of processing for dividing an attack request. FIG. 7 is a diagram illustrating an example of processing for extracting an attack command string. First, the extraction part 13a acquires a command list from the command list storage part 12a, and acquires an attack request to be processed from the attack request storage part 12b. Then, as exemplified in FIG. 6, the extraction part 13a divides the content of the attack request into fine elements and extracts a part that may include an attack command string.

Then, as exemplified in FIG. 7, the extraction part 13a refers to the command list and extracts the attack command string "cat/etc/passed" from a portion that may include an attack command string. For example, the extraction part 13a extracts, as an attack command string, a character string starting with a command in the command list or a character string after the command when there is a symbol immediately before the command from a portion that may include the attack command string.

The execution part 13b acquires information obtained by executing the attack command string extracted by the extraction part 13a. For example, the execution part 13b makes the emulator 20 execute the extracted command string and acquires information necessary for determining the intention of the attack.

Figure 8:
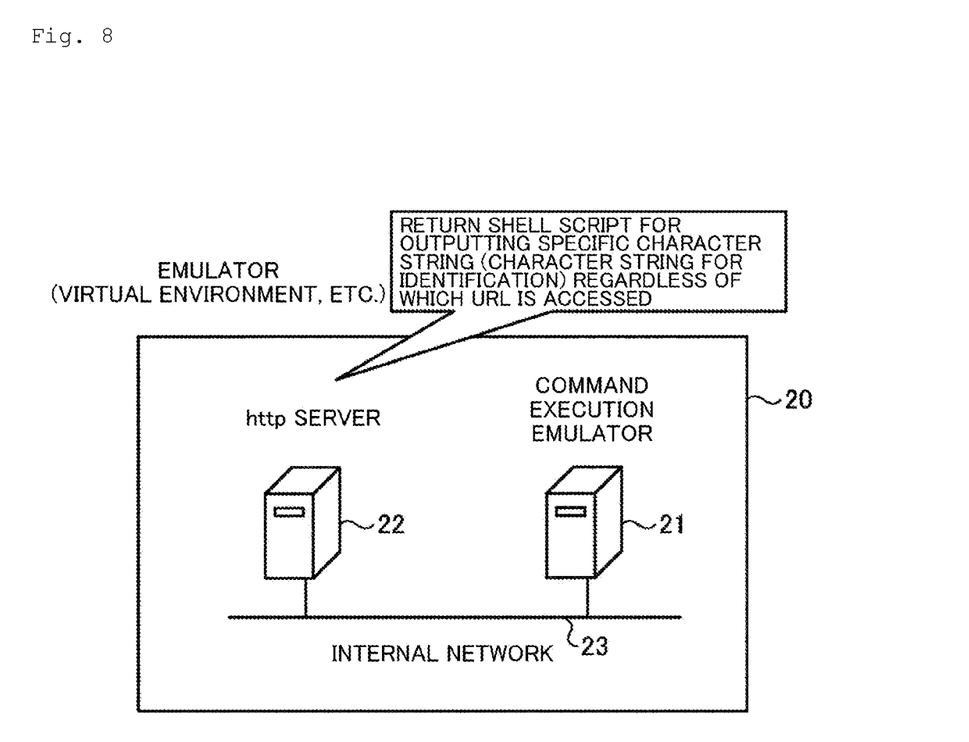
FIG. 8 is a diagram illustrating an example of an execution environment of an emulator.

FIG. 8 is a diagram illustrating an example of the execution environment of the emulator. As exemplified in FIG. 8, in the emulator 20, a command execution emulator 21 for executing a command and an http server 22 are connected by an internal network 23. Then, the http server 22 in the emulator 20 returns a shell script for outputting a specific character string (hereinafter referred to as a character string for identification) regardless of which URL is accessed.

The execution part 13b replaces an IP address and a domain name included in the command string with an IP address of the http server 22 in the internal network 23 of the emulator 20. The execution part 13b divides the command string into one command unit. Then, the execution part 13b makes the command execution emulator 21 execute the divided command strings in order to acquire information necessary for determining the intention of the attack.

The execution part 13b acquires, for example, a standard output or a standard error output, an execution time, and a system call trace log, which are output results of emulation execution as information necessary for determining the intention of the attack. For example, the execution part 13b acquires a system call log by executing the attack command string. Also, the execution part 13b acquires an execution time of the attack command string.

The identification part 13c determines an intention of the attack by the command injection using the information acquired by the execution part 13b. For example, when the standard output includes a character string for identification prepared in the http server 22 in the emulator 20, the identification part 13c determines that the intention of the attack is execution of an arbitrary command script. Here, the character string for identification is an arbitrary character string output when a script prepared in the http server 22 in the emulator 20 is executed.

Also, for example, the identification part 13c determines that the intention of the attack is falsification when the system call log acquired by the execution part 13b includes an open with authority to write to the file. That is, the identification part 13c identifies that the intention of the attack by command injection is an attack trying overwriting or the like to the file when the system call log includes an open with authority to write to the file.

Further, for example, when the execution time of the attack command string is longer than a preset DOS determination time, the identification part 13c determines that the attack is a DOS attack. Here, the DoS determination time is, for example, 10 seconds. The setting of the DoS determination time can be arbitrarily changed.

Also, for example, when the system call log acquired by the execution part 13b includes a write and includes a predetermined instruction to acquire information before the write, the identification part 13c determines that the intention of the attack is information leakage.

More specifically, when the system call log includes a write and includes open and read to the file before the write, the identification part 13c determines that the intention of the attack is information leakage. Further, when the system call log includes a write and includes an instruction to acquire information about the system such as geteuid or uname before the write, the identification part 13c determines that the intention of the attack is information leakage.

When the execution time of the attack command string acquired by the execution part 13b is equal to or shorter than the Dos determination time and is longer than a reconnaissance determination reference time that is shorter than the DOS determination time, the identification part 13c determines that the intention of the attack is vulnerability reconnaissance. Here, the reconnaissance determination reference time is, for example, 1 second. The setting of the reconnaissance determination reference time can be arbitrarily changed.

The output part 13d outputs information indicating the attack intention determined by the identification part 13c. For example, the output part 13d may display information indicating the intention of the attack or may output the information to an external device.

In this way, when an attack by command injection is detected, the analysis device 10 extracts an attack command string inserted for the attack from an attack request transmitted in the attack, and acquires information obtained by executing the extracted attack command string. Then, the analysis device 10 determines an intention of the attack by the command injection using the acquired information, and outputs information indicating the determined intention of the attack. Thus, the analysis device 10 can estimate the intention of the attack when the command injection is detected. The analysis device 10 can easily ascertain the impact of a successful attack by estimating the intention, and can contribute to detailed analysis of attacks and speeding up of countermeasures.

[Processing Procedure of Analysis Device]

Figure 9:
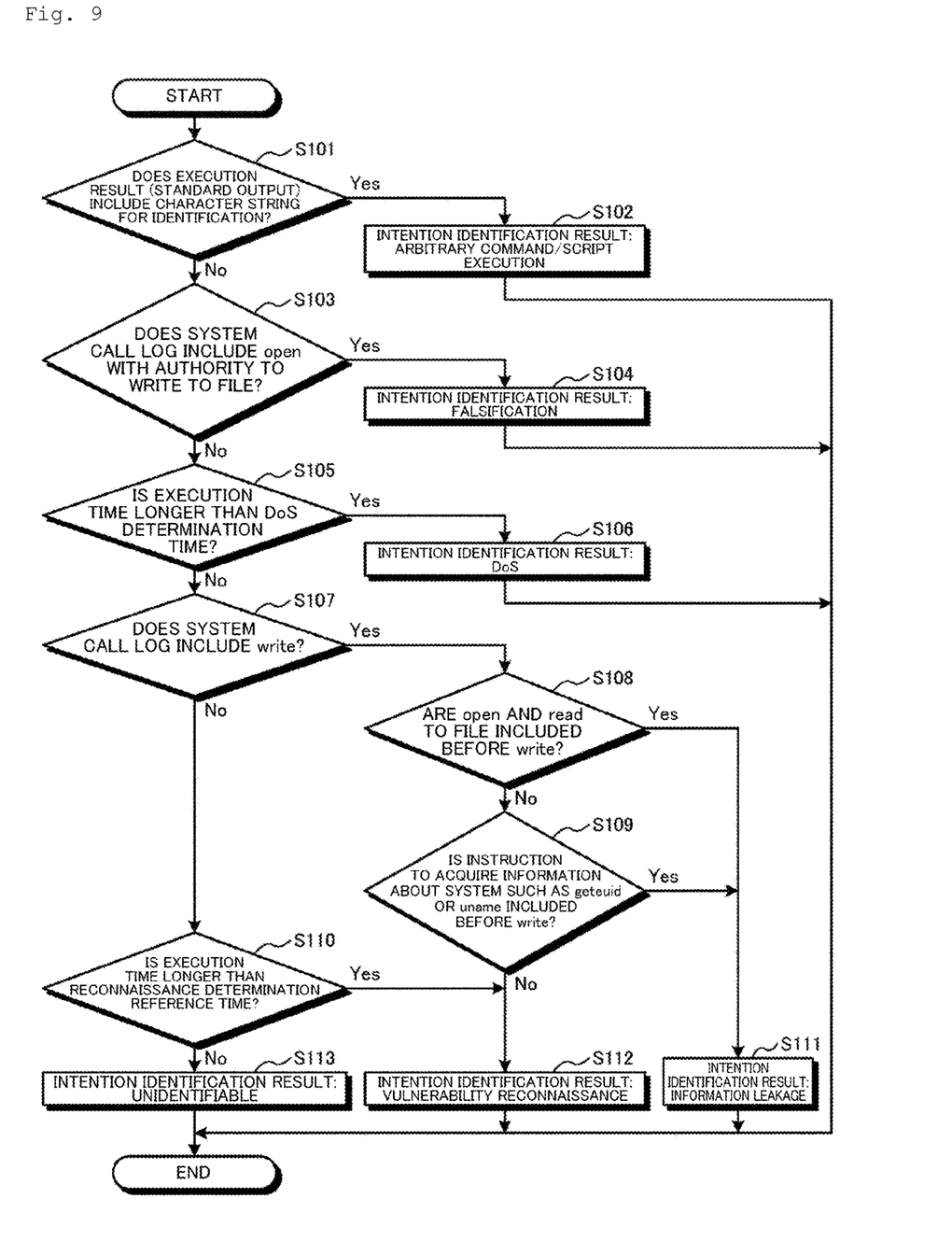
FIG. 9 is a flowchart illustrating an example of a flow of identification processing of the analysis device according to the first embodiment.

Next, an example of a processing procedure of identification processing executed by the analysis device 10 will be described with reference to FIG. 9. FIG. 9 is a flowchart illustrating an example of a flow of identification processing of the analysis device according to the first embodiment.

As exemplified in FIG. 9, the identification part 13c of the analysis device 10 determines whether or not the execution result (standard output) includes a character string for identification prepared in the http server 22 in the emulator 20 (step S101). As a result, when it is determined that the standard output includes a character string for identification prepared in the http server 22 in the emulator (YES in step S101), the identification part 13c determines that the intention of the attack is execution of an arbitrary command script (step S102).

When the standard output does not include a character string for identification prepared in the http server 22 in the emulator (No in step S101), the identification part 13c determines whether or not the system call log includes an open with authority to write to the file (step S103). As a result, when it is determined that the system call log includes an open with authority to write to the file (YES in step S103), the identification part 13c determines that the intention of the attack is falsification (step S104).

When it is determined that the system call log does not include an open with authority to write to the file (No in step S103), the identification part 13c determines whether or not the execution time of the attack command string is longer than a DoS determination time (step S105). As a result, when it is determined that the execution time of the attack command string is longer than a preset DOS determination time (YES in step S105), the identification part 13c determines a DoS attack (step S106).

When it is determined that the execution time of the attack command string is equal to or shorter than a preset DoS determination time (No in step S105), the identification part 13c determines whether or not the system call log includes a write (step S107).

As a result, when it is determined that the system call log includes a write (Yes in step S107), the identification part 13c determines whether or not open and read to the file are included before the write (step S108). When it is determined that open and read to the file are included before the write (Yes in step S108), the identification part 13c determines that the intention of the attack is information leakage (step S111).

When it is determined that the open and read to the file are not included before the write (No in step S108), the identification part 13c determines whether or not an instruction to acquire information about the system such as geteuid or uname is included before the write (step S109). As a result, when it is determined that an instruction to acquire information about the system such as geteuid or uname is included before the write (Yes in step S109), the identification part 13c determines that the intention of the attack is information leakage (step S111).

Further, when it is determined that an instruction to acquire information about the system such as geteuid or uname is not included before the write (No in step S109), the identification part 13c determines that the intention of the attack is vulnerability reconnaissance (step S112).

Returning to the description of step S107, when it is determined that the system call log does not include a write (No in step S107), the identification part 13c determines whether or not the execution time is longer than a reconnaissance determination reference time (step S110). As a result, when it is determined that the execution time is longer than a reconnaissance determination reference time (Yes in step S110), the identification part 13c determines that the intention of the attack is vulnerability reconnaissance (step S112). Further, when it is determined that the execution time is equal to or shorter than a reconnaissance determination reference time (No in step S110), the identification part 13c determines that the intention of the attack is unidentifiable (step S113).

Effects of Embodiment

In this way, when an attack by command injection is detected, the analysis device 10 according to the embodiment extracts an attack command string inserted for the attack from an attack request transmitted in the attack, and acquires information obtained by executing the extracted attack command string. Then, the analysis device 10 determines an intention of the attack by the command injection using the acquired information, and outputs information indicating the determined intention of the attack.

Therefore, the analysis device 10 can identify the intention of the detected OS command injection attack. The analysis device 10 can easily ascertain the impact of a successful attack by estimating the intention, and can contribute to detailed analysis of attacks and speeding up of countermeasures.

[System Configuration and Others]

In addition, each component of each illustrated device is functionally conceptual, and does not necessarily need to be physically configured as illustrated. That is, a specific form of distribution and integration of devices is not limited to the illustrated form, and all or a part thereof can be functionally or physically distributed or integrated in any unit according to various loads, usage conditions, and the like. Furthermore, all or any part of each processing function performed in each device can be realized by a CPU and a program analyzed and executed by the CPU, or can be realized as hardware by a wired logic.

Further, among processing operations described in the present embodiment, all or some of processing operations described as being automatically performed can be manually performed, or all or some of processing operations described as being manually performed can be automatically performed by a known method. In addition, the processing procedure, the control procedure, specific names, information including various types of data and parameters that are shown in the above document and drawings may be arbitrarily changed unless otherwise described.

[Program]

It is also possible to create a program in which the processing executed by the analysis device 10 according to the above embodiment is described in a language that can be executed by a computer. As one embodiment, the analysis device 10 can be implemented by installing an analysis program which executes the above analysis processing as package software or online software on a desired computer. For example, the information processing device can be constituted to function as the analysis device 10 by causing the information processing device to execute the above analysis program. The information processing device mentioned herein includes a desktop or laptop personal computer. In addition, information processing devices include smartphones, mobile communication terminals such as mobile phones and personal handyphone systems (PHSs), and slate terminals such as personal digital assistants (PDAs). Furthermore, the functions of the analysis device 10 may be implemented in a cloud server.

Figure 10:
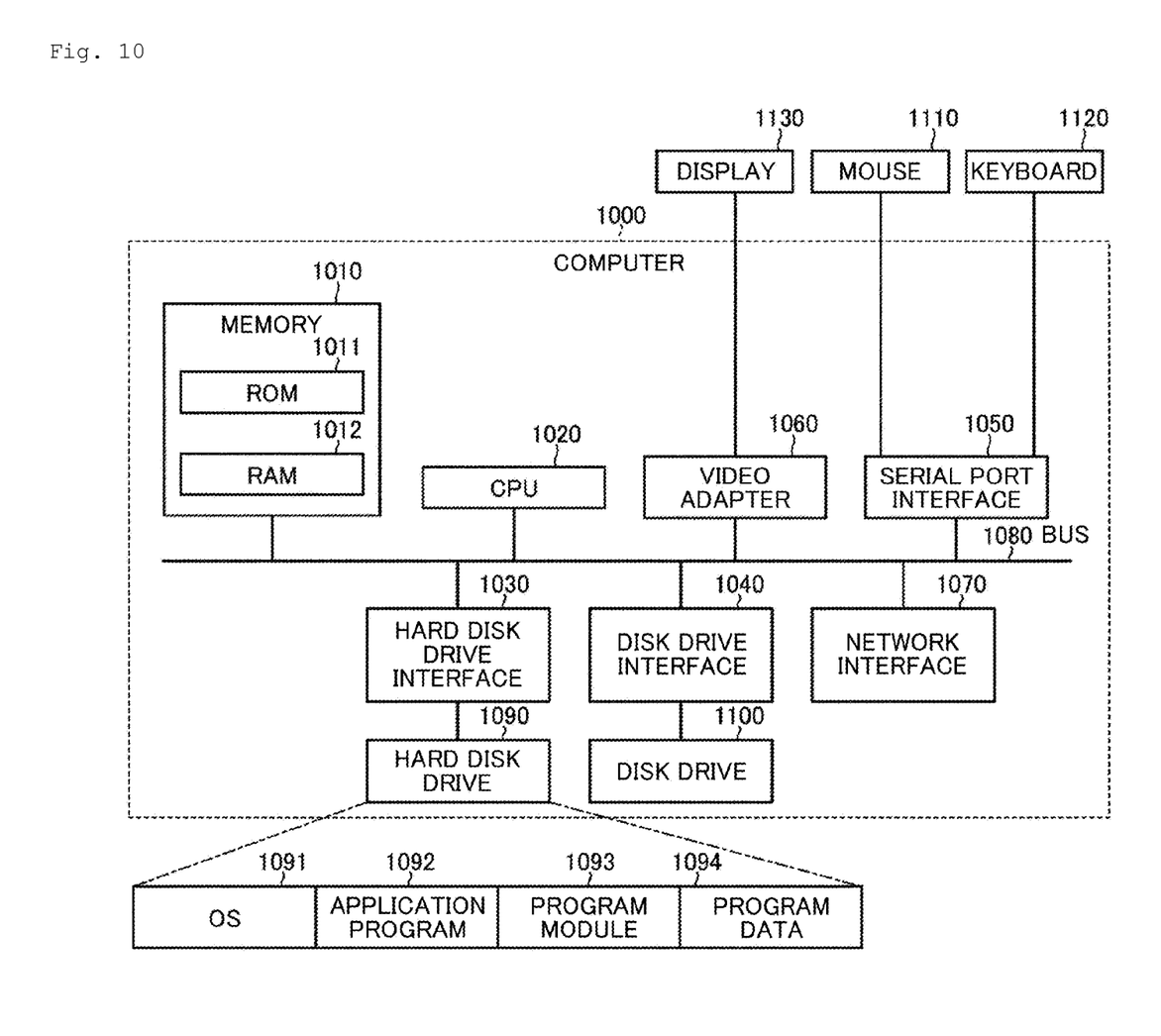
FIG. 10 is a diagram illustrating an example of a computer that executes an analysis program.

FIG. 10 is a diagram illustrating an example of a computer that executes an analysis program. A computer 1000 includes, for example, a memory 1010, a CPU 1020, a hard disk drive interface 1030, a disk drive interface 1040, a serial port interface 1050, a video adapter 1060, and a network interface 1070. These units are connected by a bus 1080.

The memory 1010 includes a read only memory (ROM) 1011 and a RAM 1012. The ROM 1011 stores, for example, a boot program, such as a basic input output system (BIOS). The hard disk drive interface 1030 is connected to a hard disk drive 1090. The disk drive interface 1040 is connected to a disk drive 1100. A detachable storage medium such as a magnetic disk or an optical disc, for example, is inserted into the disk drive 1100. A mouse 1110 and a keyboard 1120, for example, are connected to the serial port interface 1050. A display 1130, for example, is connected to the video adapter 1060.

Here, the hard disk drive 1090 stores, for example, an OS 1091, an application program 1092, a program module 1093, and program data 1094. Each of the pieces of information described in the above embodiment is stored in, for example, the hard disk drive 1090 or the memory 1010.

For example, the analysis program is stored in the hard disk drive 1090 as the program module 1093 in which instructions executed by the computer 1000 are written. Specifically, the program module 1093 in which each piece of processing executed by the analysis device 10 described in the above-mentioned embodiment is written is stored in the hard disk drive 1090.

Data used for information processing by the analysis program is stored in, for example, the hard disk drive 1090 as the program data 1094. Also, the CPU 1020 reads the program module 1093 and the program data 1094 stored in the hard disk drive 1090 to the RAM 1012 as necessary, and executes each of the above-described procedures.

Note that the program module 1093 and the program data 1094 related to the analysis program are not limited to those stored in the hard disk drive 1090 and may be stored in, for example, a removable storage medium and be read by the CPU 1020 via the disk drive 1100 or the like. Alternatively, the program module 1093 and the program data 1094 related to the analysis program may be stored in another computer connected via a network such as a LAN or a wide area network (WAN) and be read by the CPU 1020 via the network interface 1070.

Although the embodiment to which the invention made by the present inventor has been applied has been described above, the present invention is not limited by the description and the drawings that form a part of the disclosure of the present invention according to the present embodiment. That is, other embodiments, examples, operational techniques, and the like made by those skilled in the art or the like on the basis of the present embodiment are all included in the category of the present invention.

REFERENCE SIGNS LIST

1 Analysis system
10 Analysis device
11 Communication unit
12 Storage unit
12a Command list storage part
12b Attack request storage part
12c Attack command string storage part
13 Control unit
13a Extraction part
13b Execution part
13c Identification part
13d Output part
20 Emulator
30 Detector
40 Server
50 Internet

The invention claimed is:

1. An analysis device comprising:
at least one processor; and
memory storing instructions that, when executed by the at least one processor, causes the device to perform a set of operations, the set of operations comprising:

extracting, when an attack by command injection is detected, an attack command string inserted for the attack from an attack request transmitted in the attack, wherein the extracting further comprises extracting the attack command string using a predetermined list of commands;

acquiring information obtained by executing the attack command string;

determining an intention of the attack by the command injection using the acquired information; and outputting information indicating the intention of the attack, wherein the acquiring further comprises acquiring a system call log by executing the attack command string, and the determining further comprises determining that the intention of the attack is falsification when the system call log includes an open system call with authority to write to a file.

2. The analysis device according to claim 1, wherein the extracting further comprises extracting the attack command string using a preset command list.

3. The analysis device according to claim 1, wherein the acquiring further comprises acquiring an execution time of the attack command string, and the determining further comprises determining that the intention of the attack is a Denial-of-Service attack when the execution time of the attack command string is longer than a first time.

4. The analysis device according to claim 3, wherein the determining further comprises determining that the intention of the attack is vulnerability reconnaissance when:

the execution time of the attack command string is equal to or shorter than the first time, the execution time of the attack command string is longer than a second time, and the second time is shorter than the first time.

5. The analysis device according to claim 1, wherein the acquiring further comprises acquiring a system call log by executing the attack command string, and the determining further comprises determining that the intention of the attack is information leakage when the system call log includes a write system call and when the system call log further includes a predetermined instruction to acquire data before performing the write system call.

6. The analysis device according to claim 1, wherein the acquiring further comprises acquiring, as the acquired information, a result of executing the attack command string as emulation, and the result includes an output of executing the attack command string, a time duration of executing the attack command string, and a trace log of executing the attack command string.

7. An analysis method, the analysis method comprising:

extracting, when an attack by command injection is detected, an attack command string inserted for the attack from an attack request transmitted in the attack;

acquiring information obtained by executing the extracted attack command string;

determining an intention of the attack by the acquired command injection using the acquired information; and outputting information indicating the intention of the attack, wherein the acquiring further comprises acquiring a system call log by executing the attack command string, and the determining further comprises determining that the intention of the attack is falsification when the system call log includes an open system call with authority to write to a file.

8. The analysis method according to claim 7, wherein the extracting further comprises extracting the attack command string using a predetermined list of commands.

9. The analysis method according to claim 7, wherein the acquiring further comprises acquiring an execution time of the attack command string, and the determining further comprises determining that the intention of the attack is a Denial-of-Service attack when the execution time of the attack command string is longer than a first time.

10. The analysis method according to claim 9, wherein the determining further comprises determining that the intention of the attack is vulnerability reconnaissance when:

the execution time of the attack command string is equal to or shorter than the first time, the execution time of the attack command string is longer than a second time, and the second time is shorter than the first time.

11. The analysis method according to claim 7, wherein the acquiring further comprises acquiring a system call log by executing the attack command string, and the determining further comprises determining that the intention of the attack is information leakage when the system call log includes a write system call and when the system call log further includes a predetermined instruction to acquire data before performing the write system call.

12. The analysis method according to claim 7, wherein the acquiring further comprises acquiring, as the acquired information, a result of executing the attack command string as emulation, and the result includes an output of executing the attack command string, a time duration of executing the attack command string, and a trace log of executing the attack command string.

13. An analysis system comprising:

a first processor for analyzing data a second processor for emulating an attack command string, wherein the first processor is configured to execute operations comprising:

when an attack by command injection is detected, extracting the attack command string inserted for the attack from an attack request transmitted in the attack, wherein the extracting further comprises extracting the attack command string using a predetermined list of commands, acquiring information obtained by the second processor executing the attack command string, determining an intention of the attack by the command injection using the acquired information, and presenting information indicating the determined intension of the attack, and the second processor is configured to execute operations comprising:

executing the attack command string as emulation, wherein the acquiring further comprises acquiring a system call log by executing the attack command string, and the determining further comprises determining that the intention of the attack is falsification when the system call log includes an open system call with authority to write to a file.

14. The analysis system according to claim 13, wherein the extracting further comprises extracting the attack command string using a predetermined list of commands.

15. The analysis system according to claim 13,
wherein the acquiring further comprises acquiring an execution time of the attack command string,
the determining further comprises determining that the intention of the attack is a Denial-of-Service attack when the execution time of the attack command string is longer than a first time, and
wherein the determining further comprises determining that the intention of the attack is vulnerability reconnaissance when:
the execution time of the attack command string is equal to or shorter than the first time,
the execution time of the attack command string is longer than a second time, and
the second time is shorter than the first time.

16. The analysis system according to claim 13,
wherein the acquiring further comprises acquiring a system call log by executing the attack command string, and
the determining further comprises determining that the intention of the attack is information leakage when the system call log includes a write system call and when the system call log further includes a predetermined instruction to acquire data before performing the write system call.

17. The analysis system according to claim 13,
wherein the acquiring further comprises acquiring, as the acquired information, a result of executing the attack command string as emulation, and the result includes an output of executing the attack command string, an execution time of the attack command string, and a trace log of executing the attack command string.

* * * * *